United States Patent
Kilgard

(10) Patent No.: US 7,450,123 B1
(45) Date of Patent: Nov. 11, 2008

(54) SYSTEM AND METHOD FOR RENDER-TO-TEXTURE DEPTH PEELING

(75) Inventor: Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 234 days.

(21) Appl. No.: 11/259,732

(22) Filed: Oct. 25, 2005

Related U.S. Application Data

(63) Continuation-in-part of application No. 09/944,988, filed on Aug. 31, 2001, now Pat. No. 6,989,840.

(51) Int. Cl.
*G06T 15/00* (2006.01)

(52) U.S. Cl. .................. 345/426; 345/689

(58) Field of Classification Search ............ 345/426, 345/856, 618, 689
See application file for complete search history.

(56) References Cited

U.S. PATENT DOCUMENTS

| | | | |
|---|---|---|---|
| 6,690,372 B2 | 2/2004 | Donovan et al. | 345/426 |
| 6,744,433 B1 | 6/2004 | Bastos et al. | 345/422 |
| 6,975,321 B1 * | 12/2005 | Lindholm et al. | 345/506 |
| 7,098,922 B1 * | 8/2006 | Bastos et al. | 345/506 |
| 7,119,806 B1 * | 10/2006 | Donovan et al. | 345/426 |
| 7,139,003 B1 * | 11/2006 | Kirk et al. | 345/531 |

OTHER PUBLICATIONS

Mark et al., "The F-Buffer: A Rasterization Order FIFO Buffer for Multi-Pass Rendering," ACM 2001, Aug. 12-13, 2001, Siggraph, pp. 57-63.*
Mammen, Abraham, "Transparency and Antialiasing Algorithms Implemented with the Virtual Pixel Maps Technique," IEEE, vol. 9, No. 4, Jul. 1989.
Everitt, Cass, "nVIDIA: Order-Independent Transparency," http://developer.nvidia.com/attach/6402, p. 1-14, Oct. 2005.
Everitt, Cass, "nVIDIA: Order-Independent Transparency," http://developer.nvidia.com/attach/6545, NVIDIA OpenGL Applications Engineering, Oct. 2005.
"ARB_fragment_program," http://oss.sgi.com/projects/ogl-sample/registry/ARB/fragment_program.txt, Oct. 2005.
"NV_fragment_program2," http://www.nvidia.com/dev_content/nvopenglspecs/GL_NV_fragment_program2.txt, Oct. 2005.
Diefenbach, Dr. Paul., "Home Page," http://www.openworlds.com/employees/paul/, Oct. 2005.

(Continued)

*Primary Examiner*—Phu K Nguyen
(74) *Attorney, Agent, or Firm*—Zilka-Kotab, PC

(57) ABSTRACT

A system, method and computer program product are provided for performing depth peeling. In use, a first rendering pass is executed for collecting information relating to a first depth layer. Further, at least one additional rendering pass is executed for collecting additional information relating to at least one additional depth layer. Depth peeling is carried out during the execution of the rendering passes by rendering an object, creating a texture based on the rendered object, and rendering the object again utilizing the texture.

22 Claims, 12 Drawing Sheets

OTHER PUBLICATIONS

"ARB_occlusion_query,", Oct. 2005, http://oss.sgi.com/projects/ogl-sample/registry/ARB/occlusion_query.txt.

NVIDIA, "Gelato .12 PGU-Accelerated Final-Frame Renderer," http://film.nvidia.com/page/gelato.html, Oct. 2005.

"EXT_framebuffer_object,", Oct. 2005, http://oss.sgi.com/projects/ogl-sample/registry/EXT/framebuffer_object.txt.

Bernardon et al. "PGU-based Tiled Ray Casting using Depth Peeling," SCI Institute: Technical Report, University of Utah, Jul. 26, 2004.

Guha et al., "Constructive Solid Geometry: CSG Rendering and the Computational Power of Two-Sided Depth Tests on the GPU", 2002.

Guha et al., "Application of The Two-Sided Depth Test To CSG Renduring," 13D 2003-p. 1-51.

Baerentzen, Andreas, "Point Rendering for Impostors", 1998.

Im, Yeon-Ho, "A Method to Generate Soft Shadows Using A Layered Depth Imaged and Warping," IEEE Jun. 2005, vol. 11, No. 3.

Li, Wei et al., "PGU-Based Flow Simulation with Complex Boundaries," Princeton, New Jersey; Stony Brook, New York, 2002.

Weiler et al., "Textured-Encoded Tetrahedral Strips", 2000.

Diefenbach, Paul Joseph., "Pipeline Rendering: Interaction and Realism Through Hardware-Based Multi-Pass Rendering" University of Pennsylvania, 1996.

* cited by examiner

SYSTEM AND METHOD FOR RENDER-TO-TEXTURE DEPTH PEELING

RELATED APPLICATION(S)

The present application is a continuation-in-part of an application filed Aug. 31, 2001 under application Ser. No. 09/944,988, now U.S. Pat. No. 6,989,840 which is incorporated herein by reference in its entirety.

FIELD OF THE INVENTION

The present invention relates to computer graphics, and more particularly to collecting and using information in a graphics pipeline for improving an output thereof.

BACKGROUND

A major objective in graphics rendering is to produce images that are so realistic that the observer believes the images are real. A fundamental difficulty in achieving total visual realism is the complexity of accurately representing real world visual effects. A scene can include a wide variety of textures, subtle color gradations, reflections, translucency, etc. To achieve this realism, much graphics information must be collected in the graphics pipeline.

For example, one important way to make images more realistic is to determine how objects in a scene cast shadows, and then represent these shadows in the rendered image. In order to accurately portray such shadows, information in the form of various z-values must be collected.

Various other examples of graphics processing techniques exist which are used to promote realism, and require the collection of additional information. In particular, transparency rendering, blending, layered depth images (LDIs), fog, etc. are all further examples of such graphics processing techniques.

With respect to transparency rendering, for correctly rendering semi-transparent objects in a scene, back-to-front (or front-to-back assuming an alpha buffer) rendering is typically employed. In general, correct sorting of semi-transparent objects is awkward for many applications. Incorrect sorting leads to objectionable, sometimes glaring, artifacts which undermine the appearance of semi-transparency. Even when sorting is performed by the application, situations exist where objects interpenetrate or triangles overlap in such a way that there is no unique sorted order for the triangles. Depth peeling offers a way to establish a correct sorted order on a per-pixel basis so a scene can be correctly rendered with proper semi-transparency.

Computer graphics pipeline designers are always searching for new, innovative ways to collect graphics information in the graphics pipeline for enabling new graphics processing techniques and improving existing graphics processing techniques.

SUMMARY

A system, method and computer program product are provided for performing depth peeling. In use, a first rendering pass is executed for collecting information relating to a first depth layer. Further, at least one additional rendering pass is executed for collecting additional information relating to at least one additional depth layer. Depth peeling is carried out during the execution of the rendering passes by rendering an object, creating a texture based on the rendered object, and rendering the object again utilizing the texture.

BRIEF DESCRIPTION OF THE DRAWINGS

The foregoing and other aspects and advantages are better understood from the following detailed description of a preferred embodiment of the invention with reference to the following drawings.

DETAILED DESCRIPTION

Figure 1:
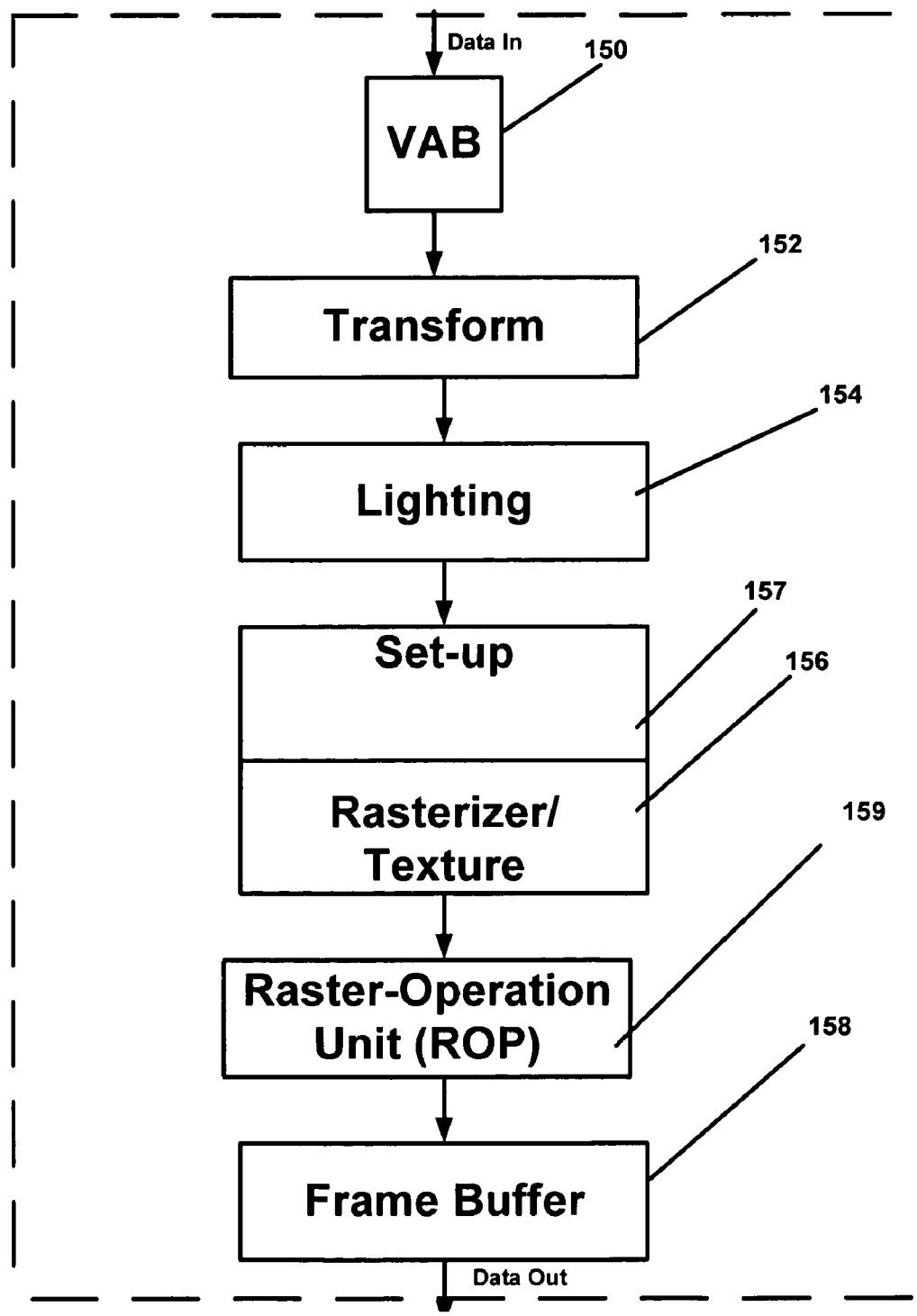
FIG. 1 is a system diagram illustrating the various components of one embodiment of the present invention.

FIG. 1 is a system diagram illustrating the various components of one embodiment of the present invention. As shown, the present embodiment may be divided into a plurality of modules including a vertex attribute buffer (VAB) 150, a transform module 152, a lighting module 154, a rasterization/texturing module 156 with a set-up module 157, a raster-operation module (ROP) 159, and a frame buffer 158.

In one embodiment, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

During operation, the VAB 150 is included for gathering and maintaining a plurality of vertex attribute states such as position, normal, colors, texture coordinates, etc. Completed vertices are processed by the transform module 152 and then sent to the lighting module 154. The transform module 152 generates vectors for the lighting module 154 to light.

The output of the lighting module 154 is screen-space data suitable for the set-up module 157, which, in turn, sets up primitives. Thereafter, rasterization/texturing module 156 carries out rasterization and texturing of the primitives. As strictly an option, the rasterization/texturing module 156 may be equipped with shadow-mapping hardware for carrying out shadow mapping. Shadow mapping is a well-known technique for depicting objects of a scene with shadows, where the per-fragment shadow-mapping results are encoded in the color and alphas channels.

Output of the rasterization/texturing module 156 is then sent to the raster-operation module 159 for performing alpha and z buffering tests. It should be noted that the alpha-test component of the hardware might be used to discard fragments/pixels that fail a depth-test performed during shadow mapping.

The output of the raster-operation module 159 is then sent to a frame buffer 158 for storage prior to being output to a display device (not shown).

Figure 2:
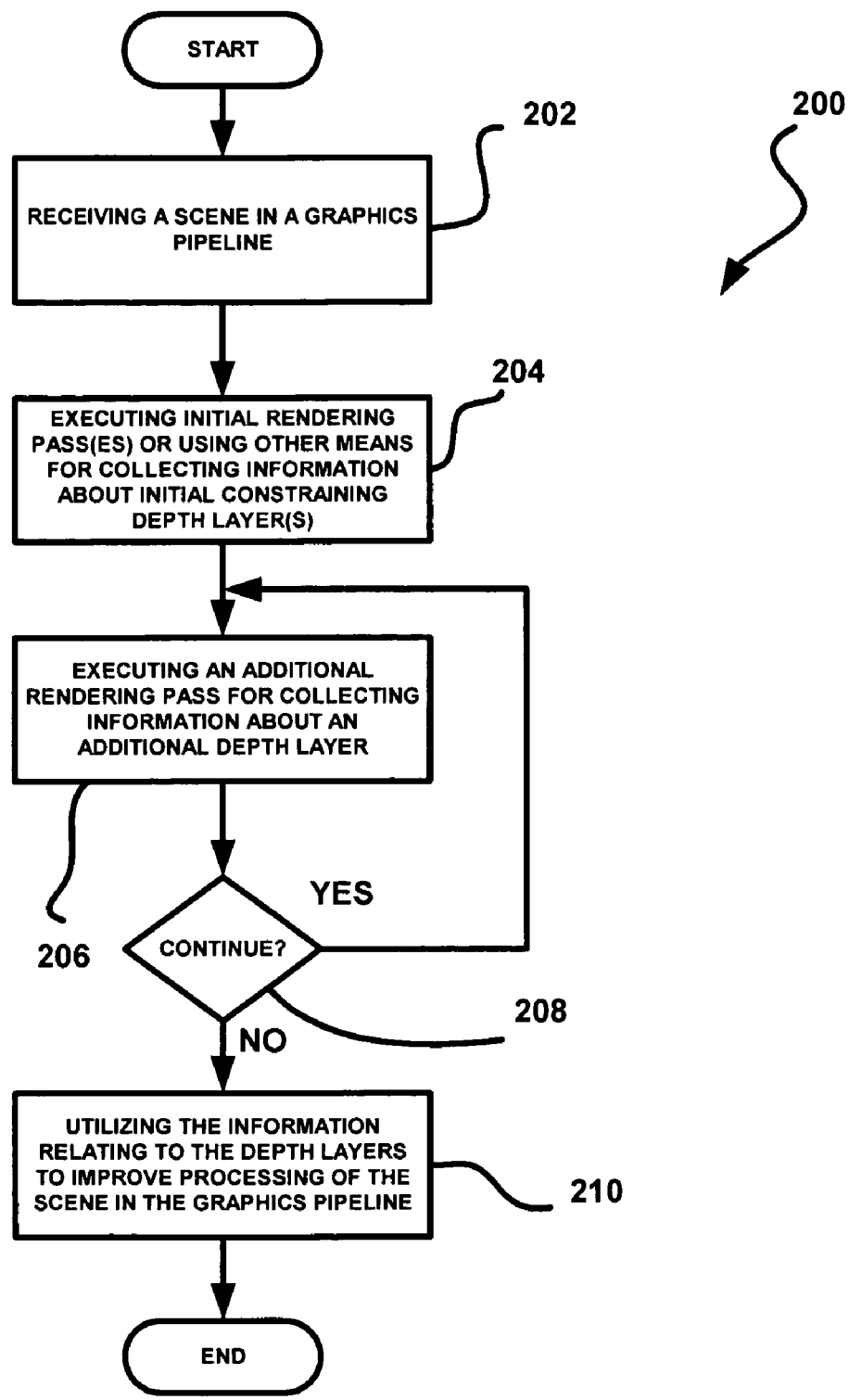
FIG. 2 illustrates a process for collecting and using information in a graphics pipeline such as that shown in FIG. 1.

FIG. 2 illustrates a method 200 for collecting and using information in a graphics pipeline such as that shown in FIG. 1. While the present method 200 is described in the context of the graphics pipeline shown in FIG. 1, it should be noted that the principles set forth herein may be implemented in any desired architecture.

Initially, in operation 202, a scene is received in the graphics pipeline. In the context of the present description, a scene may refer to any particular set of objects, polygons, primitives, etc. that are to be rendered. In particular, the scene is received in the rasterizer/texture module 156 of the pipeline of FIG. 1.

Next, in operation 204, initial rendering passes may be executed or user-created buffer received for collecting information about initial depth layers. It should be noted that the initial depth layers may be collected in any desired manner. In use, the initial depth layers may be used as constraining depth layers which inherently define a plurality of depth constraints. The manner in which such initial depth layers operate as constraining depth layers will be set forth hereinafter in greater detail.

In the context of the present description, each rendering pass refers to any separate set of processes carried out by the rasterizer/texture module 156, and/or any other module capable of performing rendering, etc. More optional information regarding the initial rendering passes in operation 204 will be set forth in greater detail during reference to FIG. 3. In addition to or as an alternative for the initial rendering passes, one or more depth layers, in the form of shadow maps, may be directly received in the graphics pipeline. For more information regarding shadow mapping, reference may be made to a patent entitled "SYSTEM, METHOD AND ARTICLE OF MANUFACTURE FOR SHADOW MAPPING" which was filed Dec. 5, 2000 under Ser. No. 09/730,639 and issued under U.S. Pat. No. 6,690,372, and which is incorporated herein by reference.

The information that is collected in operation 204 may include depth values (i.e. z-values), transparency information, color information, or absolutely any other type of data, parameters, or attributes that may be used to improve the realism resulting from the rendering process. Moreover, similar to each of the depth layers set forth in the present description, the constraining depth layers may include a portion of the scene (i.e. pixels corresponding to objects, polygons, primitives, etc.) that resides at predetermined depth levels in the scene. In the context of the present description, the term "depth" may refer to a distance or vector length between an eye/camera location and the corresponding fragment coordinates in a scene.

Thereafter, in operation 206, at least one additional rendering pass is executed for collecting information about additional depth layers. As indicated by decision 208, it is determined whether operation 206 should be repeated. In one embodiment, such operation 206 may be repeated for each additional depth layer desired. In yet another embodiment, however, it may be determined that operation 206 may be avoided for further additional depth layers (i.e. early termination, etc.). More optional information regarding such embodiment will be set forth hereinafter during reference to FIG. 8 et al., during reference to an additional embodiment. For reasons that will soon become apparent, the results of the rendering passes of operations 204 and 206 may be stored in memory such as a texture member associated with the graphics pipeline.

It should be noted that a plurality of depth tests may be performed on the results from each additional rendering pass as well as on other depth layers. Utilizing such multiple depth tests and multiple depth layers, information may be collected from a desired depth layer. More information regarding the at least one additional rendering pass and the associated multiple depth tests in operation 206 will be set forth in greater detail during reference to FIG. 4.

Once it is determined in decision 208 that no additional depth layers are desired, the information relating to each of the depth layers may be utilized to improve processing of the scene in the graphics pipeline. See operation 210. In particular, the information may be used to improve the realism resulting from the rendering process in the graphics pipeline.

Alternatively, rather than operation 210 necessarily requiring the completion of steps 204-208, the operation to incorporate peeled layers to improve realism may be interleaved with the peeling process. For example, if the semi-transparent color contributions layers are to be blended together in order, the blending of each layer into a composition buffer can occur as each layer is peeled. This approach can reduce the storage requirements by avoiding the need to retain all peeled layers.

Figure 3:
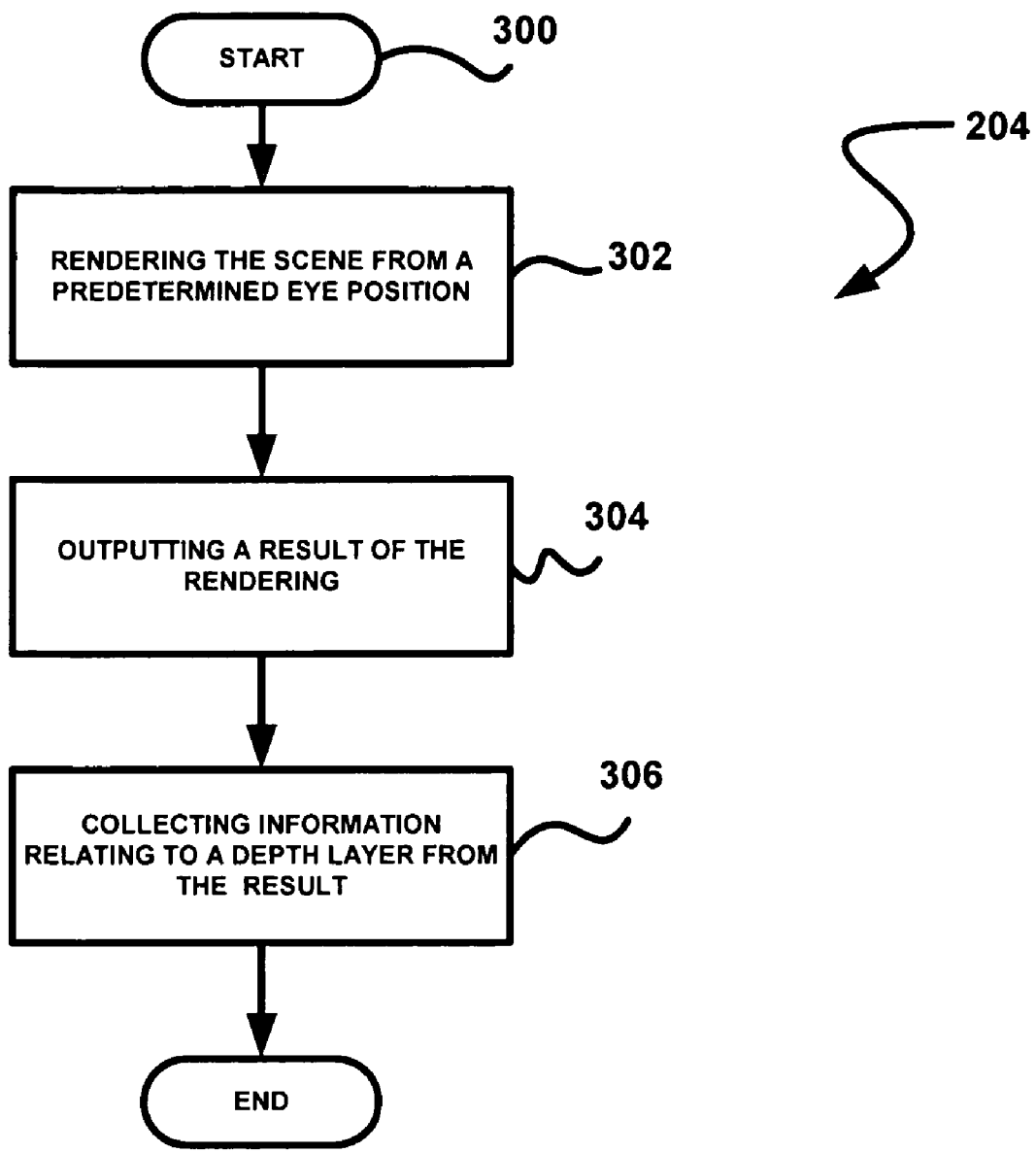
FIG. 3 illustrates a method associated with the initial rendering pass(es) of the process of FIG. 2.

FIG. 3 illustrates a method 300 associated with the initial rendering passes, in accordance with operation 204 of FIG. 2. As shown, the scene is initially rendered from a predetermined eye position in a manner that is well known in the art. See operation 302.

A result of the operation 302 is then outputted in operation 304. It should be noted that the result of operation 302 may take any form that includes at least a portion of a rendered scene from which the information (i.e. data, parameters, attributes, etc.) relating to the constraining depth layers may be collected. Note operation 306.

As mentioned earlier, the rasterization/texturing module 156 may be equipped with shadow-mapping hardware for carrying out shadow mapping. In such case, the results of operation 302 may take the form of shadow maps. Similar to other types of rendering results, information (i.e. data, parameters, attributes, etc.) relating to the constraining depth layers may be collected in the form of shadow maps.

Figure 4:
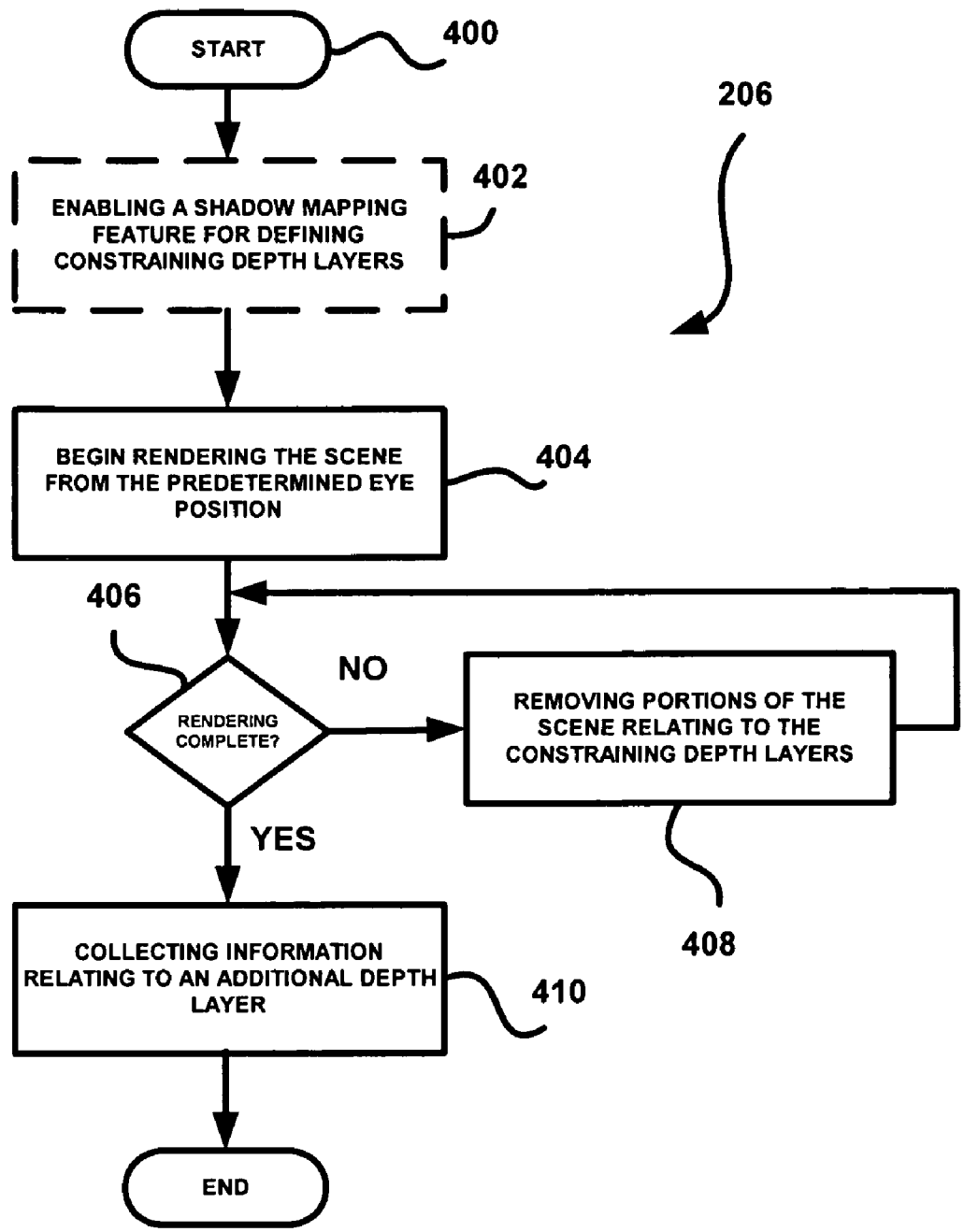
FIG. 4 illustrates a method for executing one pass of the at least one additional rendering pass of the process of FIG. 2.

FIG. 4 illustrates a method 400 for executing the at least one additional rendering pass, in accordance with operation 206 of FIG. 2. Initially, in operation 404, the scene is rendered utilizing the rasterizer/texture module 156 of the graphics pipeline. For reasons that will soon become apparent, it is important that the scene be rendered from the predetermined eye position associated with the first rendering pass of operation 204 of FIG. 2.

In the context of an embodiment where shadow-mapping and alpha-test hardware is optionally utilized, an additional optional operation may take place. In particular, a shadow-mapping feature may be enabled during the at least one additional rendering pass in operation 402. The shadow-mapping feature serves for defining the previous depth layers. In the first instance of operation 404 of FIG. 4, the previous depth layers would be defined as the constraining depth layers, and so forth. By utilizing the shadow-mapping and alpha-test hardware in such a manner, another shadow map is outputted, which may be utilized as or added to the constraining depth layers during subsequent rendering passes.

In an embodiment where the shadow-mapping and alpha-test hardware is not utilized, the constraining depth layers may simply be stored during the previous rendering pass in any desired manner.

The pendency of operation 404 is monitored in decision 406. While the at least one additional rendering pass is taking place, portions of the scene relating to the constraining depth layers may be removed in operation 408. In one embodiment, a particular set of tests may be employed to facilitate such removal. It should be noted that such tests may involve as many depth layers/constraints as necessary during each rendering pass in order to collect the desired information. More information on this test will be set forth in greater detail during reference to FIG. 5.

The purpose of operation 408 is to remove any objects, polygons, primitives, etc. or portions (in the form of fragments) thereof related to any constraining depth layers that may be obstructing the at least one additional depth layer that is currently being rendered. By removing such portions of the scene, a result of the rendering pass may be effectively used to extract the information relating to the desired depth layer. Such removal process may be referred to as depth peeling or "Z-peeling" due to the manner in which it "peels" each of the portions of the scene relating to the constraining depth layer(s).

Once it is determined that the at least one additional rendering pass is complete in decision 406, the information is collected from the results. See operation 410. Of course, such method 400 may be repeated as many times is needed to collect information from any desired number of depth layers.

Figure 5:
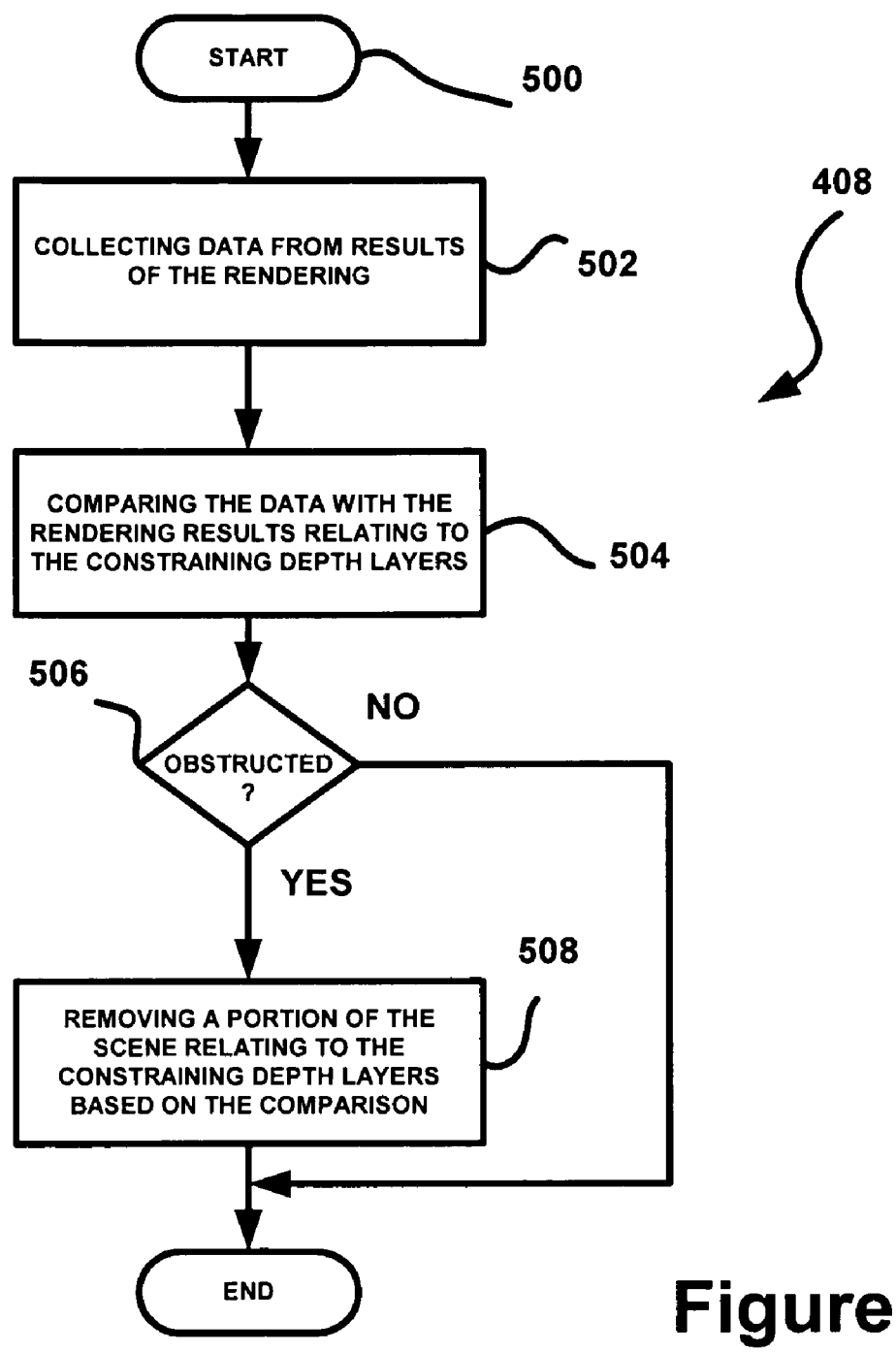
FIG. 5 illustrates a method of conducting a test to remove portions of a scene by depth peeling during one of the at least one additional rendering passes of FIG. 4.

FIG. 5 illustrates a method 500 of conducting a test for use during removal of portions of a scene during depth peeling, in accordance with operation 408 of FIG. 4. While the at least one additional rendering pass is occurring, preliminary data from results of the rendering are collected in operation 502. Such data are compared with the rendering results associated with the constraining depth layers. See operations 504 and 506. More information on the particular values associated with the data of operation 502 and the rendering results of operation 504 will be set forth during reference to FIG. 6.

In the embodiment where shadow-mapping hardware is optionally utilized, it should be noted that the rendering results take the form of shadow maps associated with the constraining depth layers. As will soon become apparent, a portion of the scene relating to the previous depth layer is removed based on the comparison in operation 508.

Figure 6:
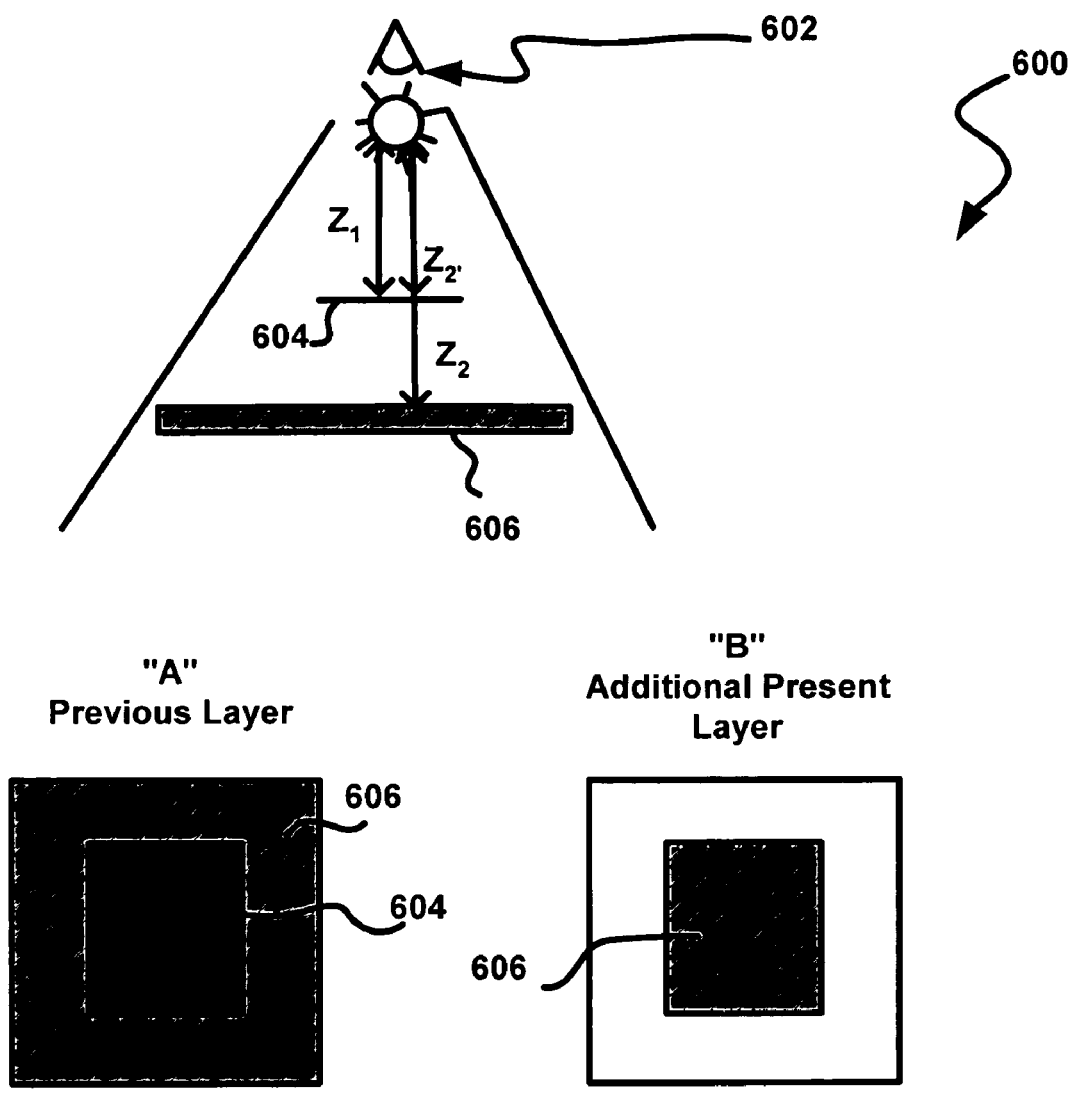
FIG. 6 illustrates the various parameters involved during the test of FIG. 5.

FIG. 6 illustrates the various parameters involved during the test of FIG. 5. As shown, a scene 600 is being rendered during the at least one additional pass from the predetermined eye position associated with the previous rendering pass. Note eye position 602. It should be noted that the example of FIG. 6 does not take into account the possibility of the existence of multiple previous layers for simplicity purposes.

In accordance with operation 502 of FIG. 5, a constraining z-value ($Z_1$) relating to a portion 604 of the scene 600 associated with the constraining depth layer is collected. Further, in accordance with operation 504 of FIG. 5, a second z-value ($Z_2$) relating to a portion 606 of the scene 600 associated with the at least one additional depth layer is collected. The "peeling" process most prevalently happens at the fragment level, so the portions 604 and 606 are generally partial polygons, or fragments of polygons.

It should be noted that the second z-value ($Z_2$) may be greater than or equal to first z-value ($Z_1$) depending on whether a portion 604 of the scene 600 associated with the previous depth layer is in front of the portion 606 of the scene 600 associated with the at least one additional depth layer. Note the second z-value ($Z_2$) and the second z-value prime ($Z_{2'}$), respectively.

In other words, during operation 504 of FIG. 5, difference values are calculated between constraining z-values ($Z_1$) relating to the constraining depth layers and z-values ($Z_2$) relating to the at least one additional depth layer. Upon no difference being calculated between the constraining z-values ($Z_1$) relating to the constraining depth layers and the z-values ($Z_2$) relating to the at least one additional depth layer (when the second z-value is $Z_{2'}$) or additionally in a situation (not shown) where $Z_2$ has a closer depth than $Z_1$, it may be assumed that the portion 604 of the scene 600 associated with the constraining depth layers obstruct the portion 606 of the scene 600 associated with the at least one additional depth layer. See decision 506 of FIG. 5. In such case, the portion 604 of the scene 600 associated with the constraining depth layers is removed before the results of the rendering are written to the frame buffer. Note the transition from "A", where the portion 604 exists, to "B", where the portion 604 is "peeled", to expose the portion 606 of the scene 600 associated with the at least one additional depth layer.

In the foregoing embodiment, the tests work from a front of the scene 600 to a back of the scene 600. Of course, the tests may also work from a back of the scene 600 to a front of the scene 600. Such back-to-front embodiment may be implemented by changing the decision 506 of FIG. 5. As an option, various other operations (i.e. <, =, <=, =>, !=, etc.) may be used during the course of the aforementioned tests.

It is thus now readily apparent that, by the nature of these tests, it is important that the additional rendering pass be taken from the predetermined eye position associated with the previous rendering passes, since, for the peeling tests to be meaningful, the fragment coordinates compared by the tests must belong to the exact same point in space. That is, the multiple rendering passes must match up exactly at fragment coordinates, which implies rendering the scene from the same eye position.

Similarly, it is also readily apparent that, by the same nature of the tests, it is important that all the rendering passes use the exact same method for producing depth values, since a slight difference in depth values for otherwise matching fragments might cause incorrect results for the depth tests. Variance in depth values may arise due to using different methods for producing such coordinates.

The present tests thus output the nearest, second nearest, etc. fragments at each pixel. The present technique may take n passes over a scene in order to get n layers deep into the scene.

Figure 7:
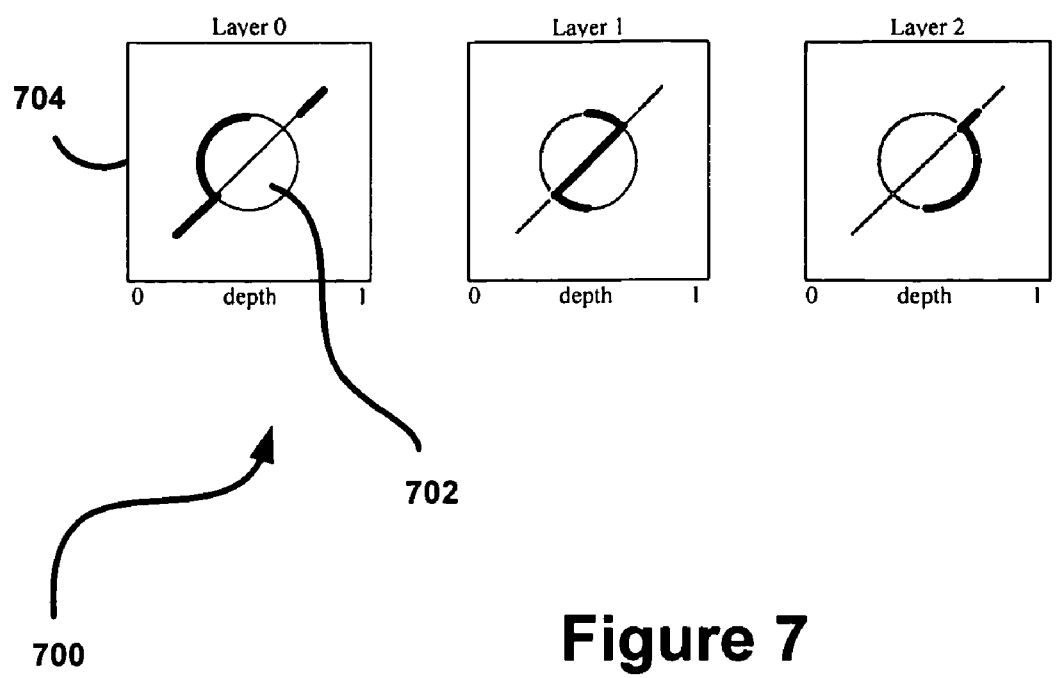
FIG. 7 illustrates an example of the depth peeling technique, in accordance with one embodiment.

FIG. 7 illustrates an example 700 of the present technique. As shown, a top view of a cross-section of a teapot 702 is provided with a camera/eye 704 on a leftmost side thereof. A plurality of stages is shown indicating results of depth peeling a plurality of depth layers. As shown, bold lines indicate the layer being captured and lighter lines indicate removed portions of the teapot that belong to other layers.

In one embodiment, the present embodiment for peeling successive layers of a scene may be carried out utilizing two depth units (depth unit0 and depth unit1) each with an associated depth buffer. Table I illustrates the pseudocode associated with such implementation. In each pass except the first, depth unit 0 is used to peel away the previously nearest fragments, while depth unit 1 performs "regular" depth buffering (in the ROP module 159).

TABLE 1

```
for (i=0; i<num_passes; i++)
{
    clear color buffer
    A = i % 2
    B = (i+1) % 2
    depth unit 0:
        if(i == 0)
            disable depth test
        else
            enable depth test
        bind buffer A
        disable depth writes
        set depth func to GREATER
    depth unit 1:
        bind buffer B
        clear depth buffer
        enable depth writes
        enable depth test
        set depth func to LESS
    render scene
    save color buffer RGBA as layer I
}
```

The present embodiment may be applied in numerous ways including computing layered depth images (LDIs), dual-depth (Woo-type) shadow mapping, order-independent transparency rendering, etc.

ADDITIONAL EMBODIMENT(S)

Figure 8:
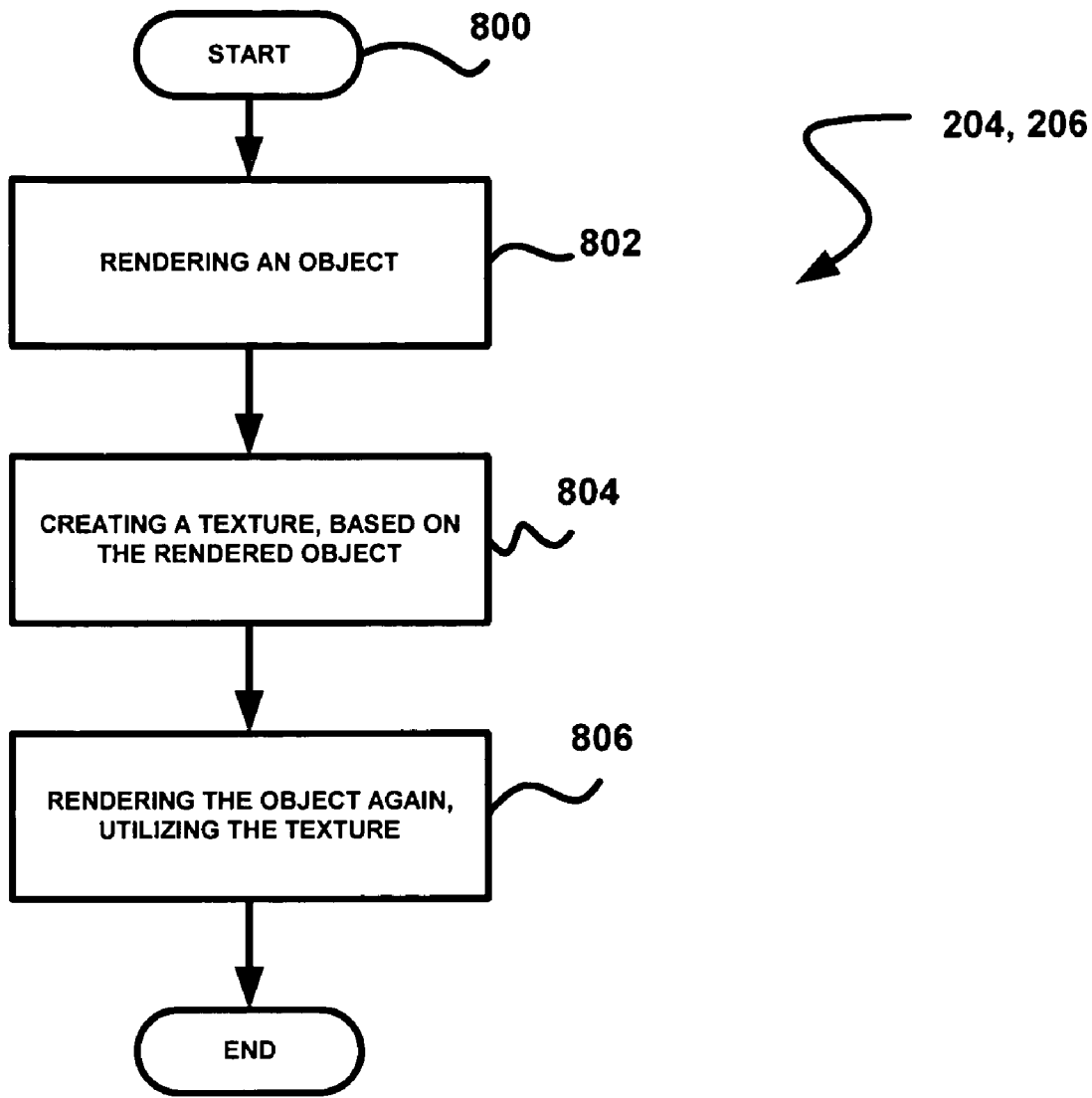
FIG. 8 illustrates a method for performing depth peeling, in accordance with one embodiment.

FIG. 8 illustrates a method 800 for performing depth peeling, in accordance with one embodiment. In one embodiment, the present method 800 may be implemented in the context of operations 204 and 206 of FIG. 2. However, it should be noted that the principles set forth herein may be implemented in any desired environment, with the exclusion of the various features set forth during the description of the foregoing figures.

In use, a plurality of rendering passes may be executed for collecting information relating to different depth layers, for performing depth peeling. Note operations 204 and/or 206 of FIG. 2, for example. During the course of the rendering passes, depth peeling may be carried out by rendering an object (i.e. anything that is the subject of graphics processing, etc.) in operation 802 during a rendering pass.

Thereafter, in operation 804, a texture is created, based on the rendered object, during an additional rendering pass. In one embodiment, the exemplary OpenGL operations in Table 2 may be used to create the texture, based on the rendered object. It should be noted, however, that such operations are merely illustrative in nature and should not be construed as limiting in any manner, as absolutely any operation or operations may be employed which are capable of creating a texture, based on the rendered object.

TABLE 2

```
glReadPixels( ) → glTexImage( )
glCopyTexImage( )
glCopyTexSubImage( )
```

Next, in operation 806, the object may be rendered again, utilizing the texture, during an additional rendering pass. To this end, multiple rendering passes may be used to perform the depth peeling with a "render-to-texture" feature. While operations 802-806 are described herein to be carried out during the course of separate rendering passes, it is contemplated that more than one operation may be carried out, if possible, during a single rendering pass.

In one embodiment, the foregoing operations may be performed utilizing a plurality of buffers. By using such "render-to-texture" feature during depth peeling, copying of the information from at least one of the buffers is avoided after each of the rendering passes.

More illustrative information will now be set forth regarding various optional architectures and features with which the foregoing depth peeling technique may or may not be implemented, to achieve the foregoing. It should be strongly noted that the following information is set forth for illustrative purposes and should not be construed as limiting in any manner. Any of the following features may be optionally incorporated with or without the exclusion of other features described.

Figure 9:
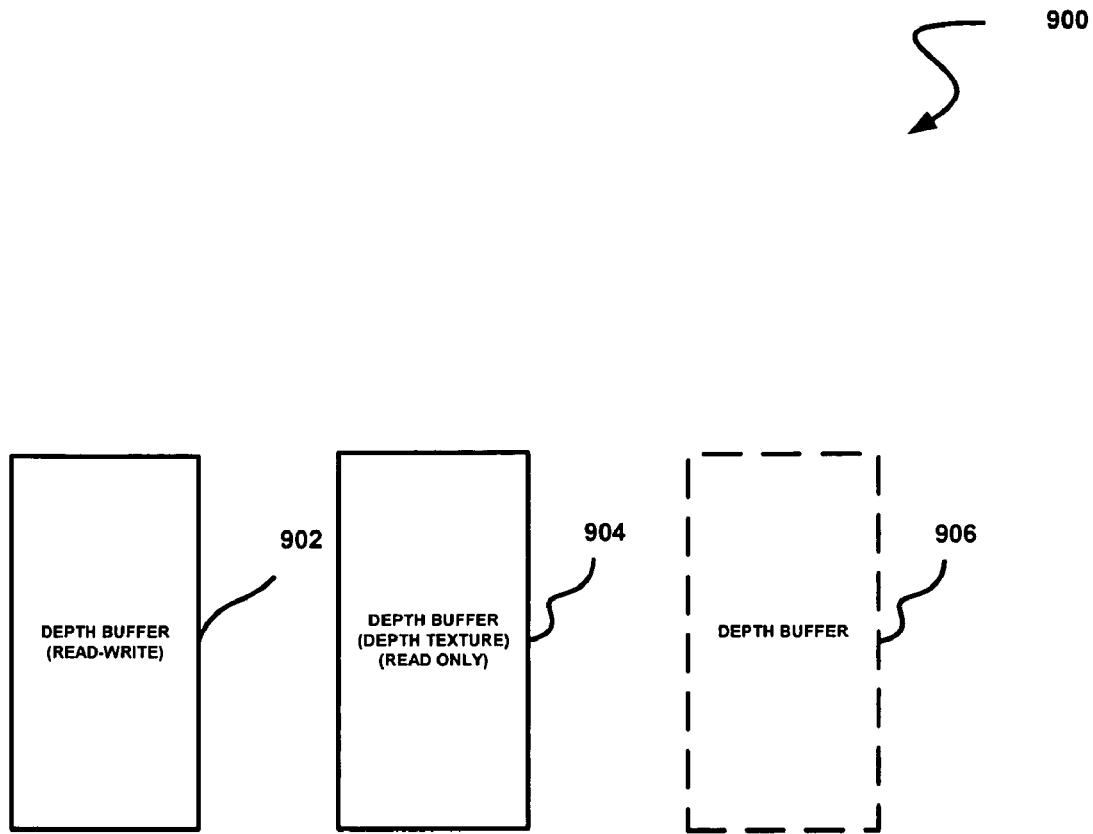
FIG. 9 illustrates a plurality of buffers for performing depth peeling, in accordance with one embodiment.

FIG. 9 illustrates a plurality of buffers 900 for performing depth peeling, in accordance with one embodiment. In one embodiment, the present buffers 900 may be used in one exemplary implementation of the method 800 of FIG. 8. Further, the present buffers 900 may be used during depth peeling in the context of transparency rendering. However, it should be noted that the present buffers 900 may be implemented in any desired environment for any desired application.

As shown, at least a pair of depth buffers is provided including a first depth buffer 902 that is capable of being read and written and a second buffer 904 that is only capable of being read. Contents of the second depth buffer 904 may further be referred to as depth textures, for reasons that will soon become apparent. In various embodiments, the second buffer 904 may be associated with a shadow mapping feature or, in other words, depth textures with a depth comparison filtering mode.

Optionally, a third depth buffer 906 may be used to store depth values associated with completely opaque objects. Using the third depth buffer 906, objects situated behind the completely opaque objects may be rejected. Specifically, the third depth buffer 906 may be used to store the depth values for all 100% opaque objects in a scene, so that fragments may be rejected during all peeling passes that are behind such 100% opaque objects.

More information will now be set forth regarding one exemplary method in which the foregoing depth buffers 900 may be used during the course of depth peeling using a render-to-texture capability.

Figure 10:
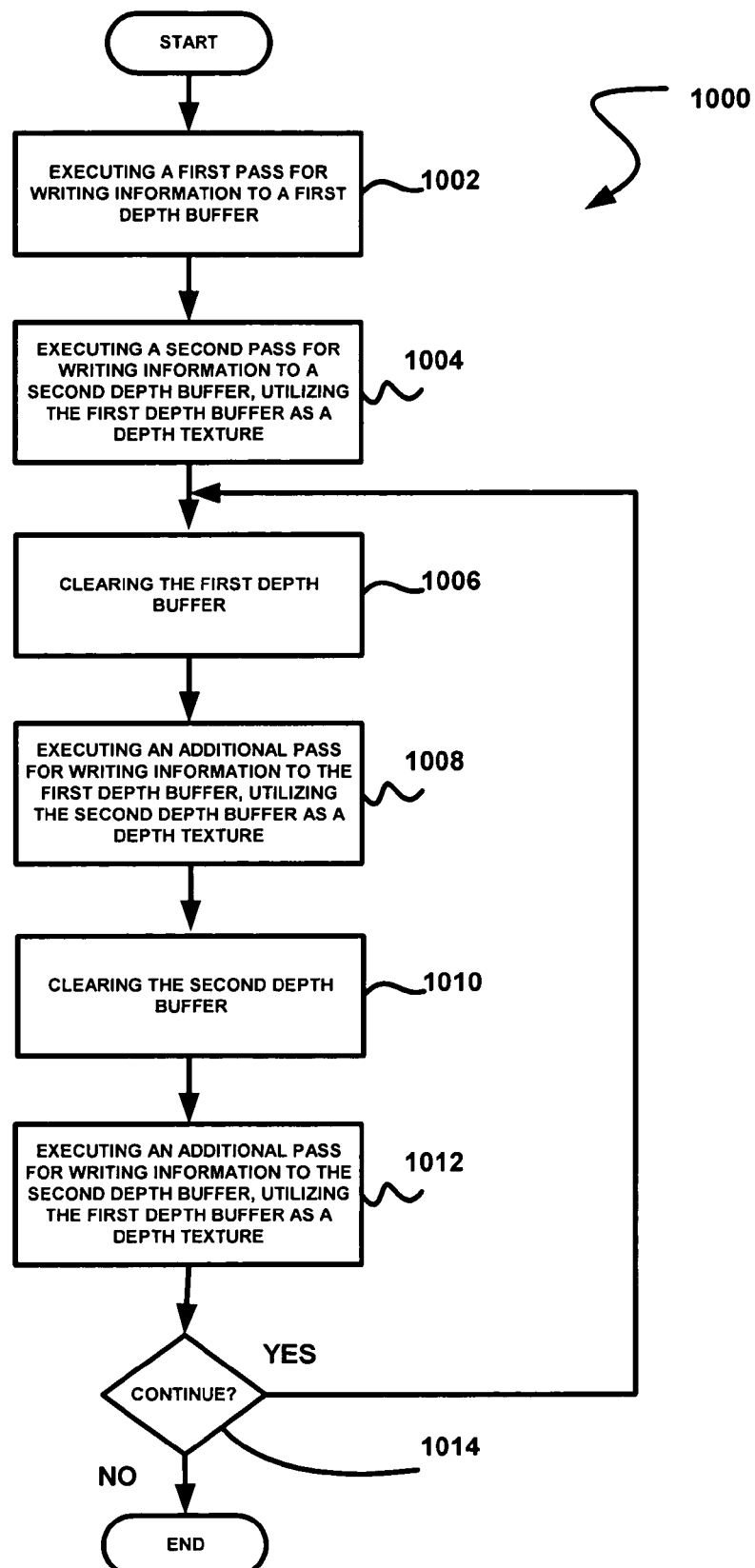
FIG. 10 illustrates a method with which depth peeling may be accomplished utilizing the depth buffers of FIG. 9, in accordance with one embodiment.

FIG. 10 illustrates a method 1000 with which depth peeling may be accomplished utilizing the depth buffers of FIG. 9, in accordance with one embodiment. As shown, in operation 1002, a first rendering pass is executed for collecting information (e.g. color and/or depth information, etc.) relating to a first depth layer. During operation 1002, the information is written to a first depth buffer (e.g. see, for example, the first depth buffer 902 of FIG. 9, etc.). In the present operation, the first depth buffer takes the form of a read-write buffer.

As will soon become apparent in the following operations, the role of the first and second depth buffer switch during each subsequent rendering pass. In particular, in the following operation, the first depth buffer becomes a read-only buffer and the second depth buffer becomes a read-write buffer, etc.

Next, in operation 1004, a second rendering pass is executed for collecting information relating to a second depth layer. During operation 1004, the information is written to a second depth buffer that is now designated as being a read-write buffer (the first depth buffer is designated as a read-only buffer). Further during the instant operation, the second rendering pass is executed utilizing contents of the first depth buffer as a depth texture. For example, the second depth buffer is written only if the current information has an associated depth value that is less than that stored in the first depth buffer.

Before the role of the buffers may again alternate, in operation 1006, the first depth buffer is cleared. To this end, in operation 1008, an additional rendering pass is executed for collecting information relating to another depth layer. During operation 1008, the information is written to the previously cleared first depth buffer, now designated a read-write buffer. Further during the instant operation, the additional rendering pass is executed utilizing contents of the second depth buffer as a depth texture, in a manner similar to before.

Similar to operation 1006, the second depth buffer is cleared in operation 1010. Thus, in operation 1012, yet another rendering pass is executed for collecting information relating to yet another depth layer. During operation 1012, the information is written to the previously cleared second depth buffer, now designated a read-write buffer. Further during the instant operation, the instant rendering pass is executed utilizing contents of the first depth buffer as a depth texture, in a manner similar to before.

As mentioned during the description of the method 200 of FIG. 2, the decision 208 therein continued to execute additional rendering passes until no further depth layers existed. In the present embodiment, however, decision 1014 may optionally be configured to conditionally terminate the repetition of the rendering passes prior to addressing all available depth layers.

In one embodiment, the aforementioned termination may be performed utilizing occlusion queries. In the context of the present description, an occlusion query may refer to a query which requests a number of pixels (or, more precisely, samples) drawn by a primitive or group of primitives. The primary purpose of such a query is to determine the visibility of an object. Specifically, in the present context, the method 1000 may terminate upon an occlusion query indicating that no pixels were drawn during a previous rendering pass.

In another embodiment, the aforementioned termination may be performed based on a threshold. For example, it is determined whether a pixel count is below a predetermined threshold. Of course, in a simplistic embodiment, the threshold may be equal to zero (0). Further, low-value thresholds (e.g. close to, but not equal to zero (0), etc.) may result in avoidance of peeling operations that contribute an insignificant number of peeled pixels.

In yet another embodiment, the aforementioned termination may be performed utilizing a stencil buffer. This may be accomplished by terminating when the stencil buffer has reached pixels that have 100% opacity or further layers that are 100% transparent. In yet another embodiment, the aforementioned termination may be performed utilizing a pixel shader. In the present embodiment, the termination may occur similar to the stencil buffer, with the exception that a single-pass shader is used to composite the layers.

In various embodiments, the rendering may be performed from a back of a scene to a front of the scene, which may be beneficial since the system is not required to render 100% opaque objects during peeling (except for the first rendering pass). In yet another embodiment, the rendering may be performed from a front of a scene to a back of the scene, which may facilitate the aforementioned early termination technique. While not illustrated, in still yet another embodiment, the information from the depth layers is blended in a single rendering pass.

To this end, copying the information (e.g. color and/or depth information) from at least one of the buffers is avoided after each of the rendering passes. This is accomplished by the utilizing the aforementioned "render-to-texture" feature and alternating the role of the buffers in the foregoing manner.

Further, clearing of at least one of the buffers may be avoided during additional rendering passes. Note that only the first depth buffer is cleared in operation 1006 in conjunction with the rendering pass of operation 1008, and only the second depth buffer is cleared in operation 1010 in conjunction with the rendering pass of operation 1012. Thus, the present technique eliminates max(0,N−2) depth clears per frame, where N is the number of depth layers that are peeled.

In one embodiment, the aforementioned clearing may be avoided by segregating at least one of the buffers into a plurality of ranges. More information regarding such segregation and the manner in which the depth buffer clears are avoided will be set forth in greater detail during reference to FIG. 11.

Figure 11:
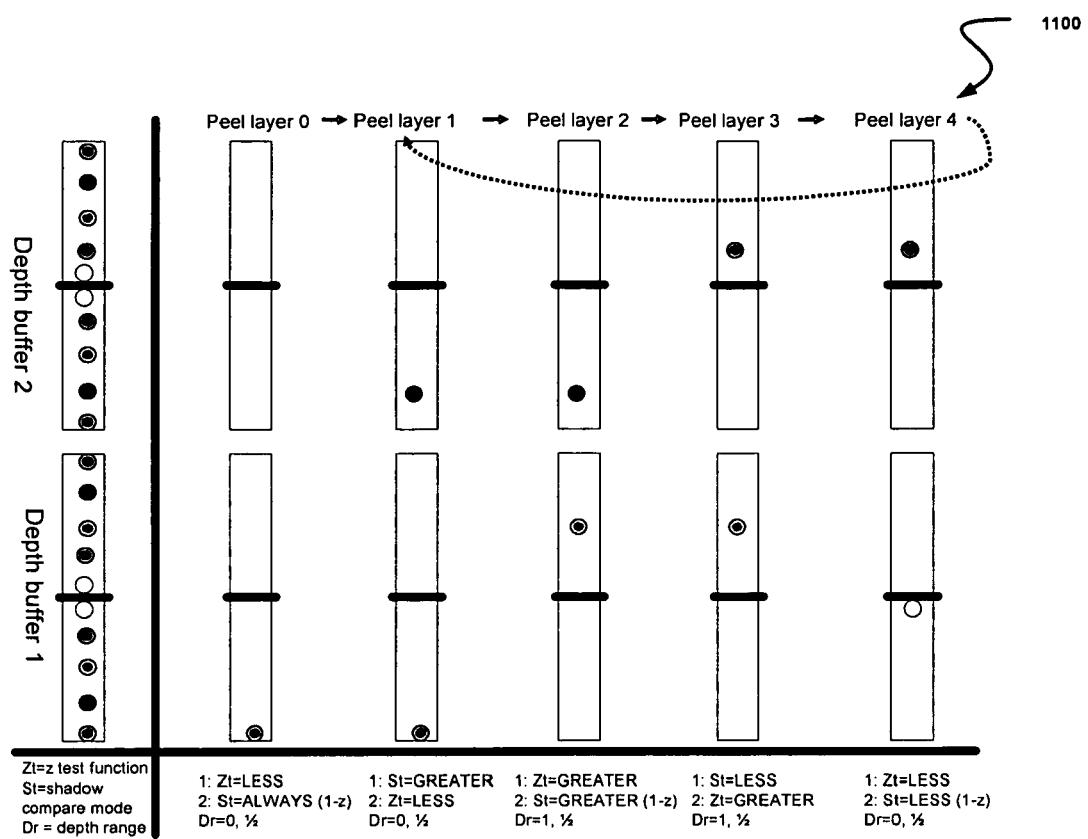
FIG. 11 illustrates a technique for segregating the depth buffers of FIG. 9 for facilitating the avoidance of at least one depth buffer clear operation.

FIG. 11 illustrates a technique 1100 for segregating the depth buffers of FIG. 9 for facilitating the avoidance of at least one of the depth buffer clear operations (e.g. see, for example, operations 1006 and 1008 of FIG. 10, etc.). Further, FIG. 11 illustrates the contents of the various buffers, as well as the Z-test function, shadow compare mode, and relevant depth range as the buffers "ping-pong" back and forth, during each rendering pass for peeling the various depth layers.

While not shown, prior to use, both the first and second depth buffer may be cleared to 0.5. As will soon become apparent, only one depth buffer clear, per rendering pass, is required thereafter.

As shown, during an initial rendering pass (for peeling layer 0), the first depth buffer is written (see, for example, operation 1002 of FIG. 10, etc.) by taking into consideration only a depth range that spans half the possible depth range, namely 0, ½. Further, the first depth buffer uses a less than operator as the Z-test function. In other words, the first depth buffer is written with the information associated with the current layer, only if an associated depth value is less than the depth value associated with the contents of the second depth buffer (based on the shadow compare mode). Since the second depth buffer is empty during the first rendering pass, the shadow compare mode is always (1−z). Thus, any depth value associated with the first depth buffer is always less than 1−z and, therefore, the first depth buffer is always written during the initial rendering pass.

Next, during a second rendering pass (for peeling layer 1), the second depth buffer is written (see, for example, operation 1004 of FIG. 10, etc.) by taking into consideration only a depth range that spans half the possible depth range, namely 0, ½. Further, the second depth buffer uses a less than operator as the Z-test function. In other words, the second depth buffer is written with the information associated with the current layer, only if an associated depth value is less than the depth value associated with the contents of the first depth buffer. Further, the second rendering pass is executed utilizing contents of the first depth buffer, as shown, as a depth texture, where the shadow compare mode is a greater than operator.

In the course of a third rendering pass (for peeling layer 2), the first depth buffer is cleared and written (see, for example, operations 1006-1008 of FIG. 10, etc.) by taking into consideration only a depth range that spans an opposite half of the possible depth range, namely 1, ½. It is notable that the "sense" of the first depth range is switched (to 1, ½). Thus, the first depth buffer uses a greater than operator as the Z-test function (due to the change in "sense"). In other words, the first depth buffer is written with the information associated with the current layer, only if an associated depth value is greater than the depth value associated with the contents of the second depth buffer. Further during the instant operation, the third rendering pass is executed utilizing contents of the second depth buffer, as shown, as a depth texture, where the shadow compare mode is a greater than (1−z) operator. It should be understood that the use of the (1−z) calculation is utilized each time the "sense" of the depth buffer is switched.

During a fourth rendering pass (for peeling layer 3), the second depth buffer is cleared and written (see, for example, operations 1010-1012 of FIG. 10, etc.) by taking into consideration only a depth range that spans half the possible depth range, namely 1, ½. Further, the second depth buffer uses a greater than operator as the Z-test function. Also, the fourth rendering pass is executed utilizing contents of the first depth buffer, as shown, as a depth texture, where the shadow compare mode is a less than operator.

Thereafter, in a fifth rendering pass, it is noted that operation proceeds with parameters similar to that in the first rendering pass. In other words, the Z-test function, shadow compare mode, and relevant depth range parameters repeat after a cycle of four (4) rendering passes. Of course, it should be understood that the shadow compare modes of the first and fifth rendering pass are shown to be different, in FIG. 11, since there were no contents in the second depth buffer during the first rendering pass.

It should be noted that the present system may hit all pixels to ensure that the foregoing "z-trick" feature works properly. Of course, in the present embodiment, every peeled layer is a subset of peeled pixels from the last frame. Thus, this is sufficient for the foregoing depth peeling technique to work properly.

By these features, depth layers may be peeled more efficiently by combining "render-to-texture" capabilities (where you can render to the contents of a color and/or depth texture and subsequently texture with those contents) and shadow mapping (where depth values stored in a texture are compared with a reference depth). In some embodiments, this approach may be more efficient by avoiding copies of buffers during depth peeling, compositing without read-modify-write blending, and early termination of the compositing per-pixel as soon as a compositing shader determines no further layers will affect the final composited result for a pixel.

Further, the required memory may be reduced (and performance improved) because the same textures are used for rendering, thus a frame buffer need not necessarily be allocated in addition to color and depth texture buffers. Additionally, when the peeled color layers are composited to create a correctly ordered semi-transparent final image, pixel shaders may be used to combine the images in a single rendering pass using an "under" compositing operation. The "under" compositing operation refers to a technique where blending is performed in front-to-back order. Unlike back-to-front blending, one can terminate the compositing process on a per-pixel basis as soon as a 100% opaque or a peeled color layer that is 0% opaque is encountered. This means one can often avoid reading and compositing all the peeled layers at every pixel.

While various applications of the foregoing techniques have been set forth herein, it should be understood that any other applicable application is contemplated. Note Table 3, which lists a non-exhaustive compilation of illustrative applications.

TABLE 3

Figure 12:
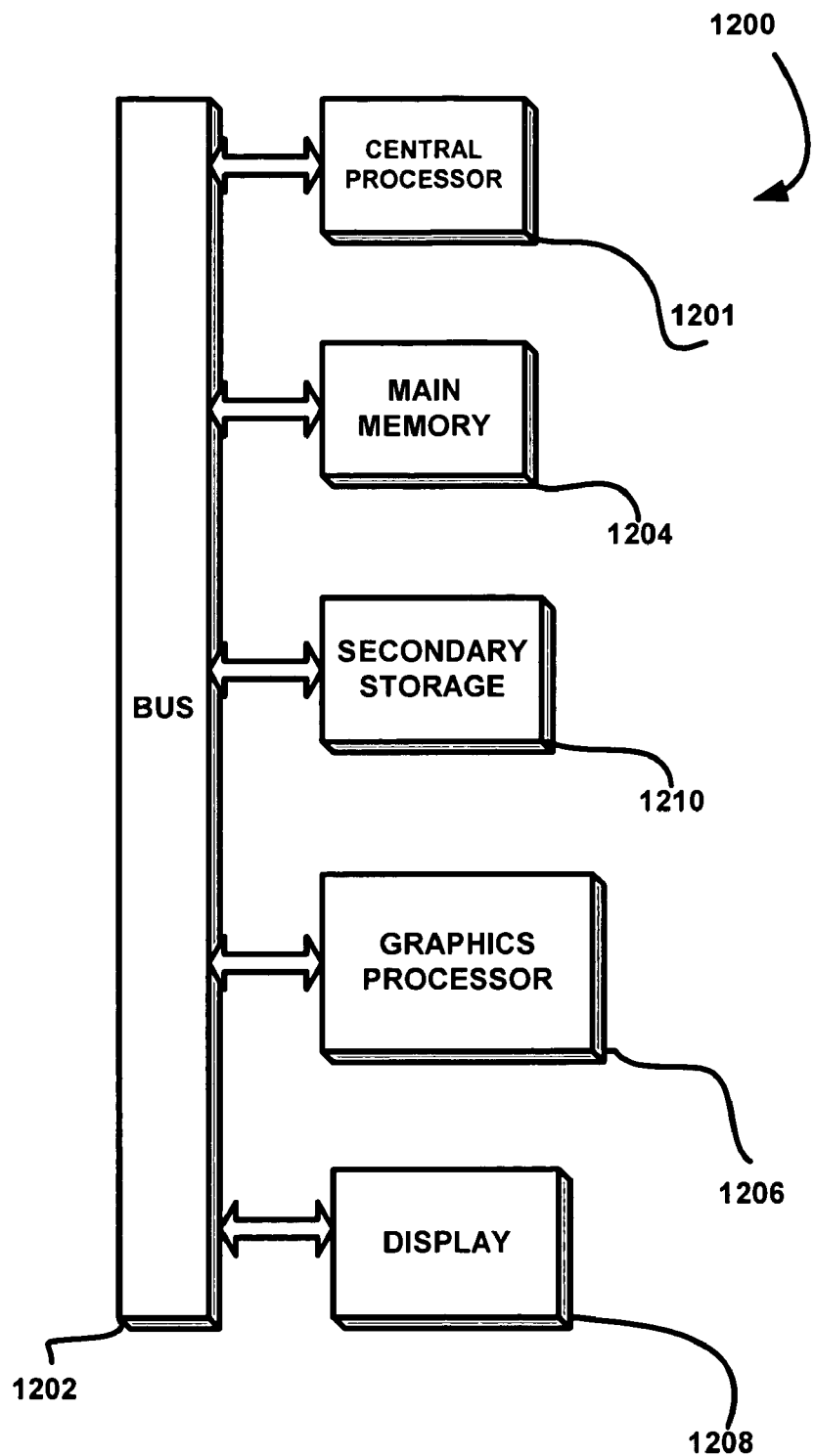
FIG. 12 illustrates an exemplary computer system in which the architecture and/or functionality of various embodiments may be implemented.

Accelerated GPU-based ray tracing
Constructive Solid Geometry
Global illumination
Point rendering TABLE 3-continued Shadow mapping
Flow simulation
Volume rendering FIG. 12 illustrates an exemplary computer system 1200 in which the various architecture and/or functionality of the various previous embodiments may be implemented. As shown, a computer system 1200 is provided including at least one central processor 1201 which is connected to a communication bus 1202. The computer system 1200 also includes a main memory 1204. Control logic (software) and data are stored in the main memory 1204 which may take the form of random access memory (RAM).

The computer system 1200 also includes a graphics processor 1206 and a display 1208, i.e. a computer monitor. In one embodiment, the graphics processor 1206 may include a transform module, a lighting module, and a rasterization module (see the system of FIG. 1, for example). Each of the foregoing modules may even be situated on a single semiconductor platform to form a graphics processing unit (GPU).

The computer system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1204 and/or the secondary storage 1210. Such computer programs, when executed, enable the computer system 1200 to perform various functions. Memory 1204, storage 1210 and/or any other storage are possible examples of computer-readable media.

In one embodiment, the architecture and/or functionality of the various previous figures may be implemented in the context of the central processor 1201, graphics processor 1206, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture.

2. The method as recited in claim 1, wherein the method is carried out utilizing a plurality of buffers.

3. The method as recited in claim 2, wherein a first one of die buffers is capable of being read and written.

4. The method as recited in claim 3, wherein a second one of the buffers is only capable of being read.

5. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture;
wherein the method is carried out utilizing a plurality of buffers;
wherein a first one of the buffers is capable of being read and written;
wherein a second one of the buffers is only capable of being read;
wherein copying the information from at least one of the buffers after each of the rendering passes is avoided.

6. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture;
wherein the method is carried out utilizing a plurality of buffers;
wherein clearing of at least one of the buffers is avoided during the at least one additional rendering pass.

7. The method as recited in claim 6, wherein the clearing is avoided by segregating at least one of the buffers into a plurality of ranges.

8. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture;
wherein the executing operations are repeated, and the repeating is conditionally terminated prior to executing the additional rendering passes for all available depth layers.

9. The method as recited in claim 8, wherein the terminating is performed utilizing occlusion queries.

10. The method as recited in claim 8, wherein the terminating is performed based on a threshold.

11. The method as recited in claim 8, wherein the terminating is performed utilizing a pixel shader.

12. The method as recited in claim 8, wherein the terminating is performed utilizing a stencil buffer.

13. The method as recited in claim 12, wherein the terminating is performed when the stencil buffer has reached pixels that have 100% opacity or further layers that are 100% transparent.

14. The method as recited in claim 9, wherein the terminating is performed upon an occlusion query indicating that no pixels were drawn during a previous rendering pass.

15. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture;
wherein information from the peeled depth layers is blended from back-to-front.

16. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture;
wherein information from the peeled depth layers is blended from front-to-back.

17. The method as recited in claim 16, wherein the blending of the information from the peeled depth layers is interleaved with the depth peeling.

18. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture;
wherein the information collected from the depth layers is blended in a single rendering pass.

19. A method for performing depth peeling, comprising:
executing a first rendering pass for collecting information relating to a first depth layer; and
executing at least one additional rendering pass for collecting additional information relating to at least one additional depth layer;
wherein depth peeling is carried out during the execution of the rendering passes by:
rendering an object,
creating a texture, based on the rendered object, and
rendering the object again, utilizing the texture;
wherein the method is carried out utilizing a plurality of buffers;
wherein a first one of the buffers is capable of being read and written;
wherein a second one of the buffers is only capable of being read;

wherein a third one of the buffers stores depth values associated with completely opaque objects, where objects situated behind the completely opaque objects are rejected.

20. A computer storage medium for storing a computer program for performing depth peeling, comprising:
   computer code for executing a first rendering pass for collecting information relating to a first depth layer; and
   computer code for executing at least one additional rendering pass for collecting additional information relating to at least one additional depth layer;
   wherein depth peeling is carried out during the execution of the rendering passes by:
      rendering an object,
      creating a texture, based on the rendered object, and
      rendering the object again, utilizing the texture.

21. A system for performing depth peeling, comprising:
   a processor for executing a first rendering pass for collecting information relating to a first depth layer, and at least one additional rendering pass for collecting additional information relating to at least one additional depth layer;
   wherein depth peeling is carried out during the execution of the rendering passes by:
      rendering an object,
      creating a texture, based on the rendered object, and
      rendering the object again, utilizing the texture.

22. The system as recited in claim 21, wherein further included is a bus, and a display in communication with the bus, where the processor resides in communication with the bus and the display.

* * * * *